(12) United States Patent
Radic

(10) Patent No.: US 6,781,749 B2
(45) Date of Patent: Aug. 24, 2004

(54) INTERLEAVING COMBINER FOR A BIDIRECTIONAL WAVELENGTH-DIVISION MULTIPLEXING SYSTEM

(75) Inventor: Stojan Radic, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 145 days.

(21) Appl. No.: 10/127,189

(22) Filed: Apr. 22, 2002

(65) Prior Publication Data

US 2003/0197919 A1 Oct. 23, 2003

(51) Int. Cl.$^7$ ................................................. H01S 3/00
(52) U.S. Cl. ................................................. 359/341.2
(58) Field of Search .................. 359/341.2; 398/49–50, 398/86

(56) References Cited

U.S. PATENT DOCUMENTS

| | | | | |
|---|---|---|---|---|
| 6,130,971 A | | 10/2000 | Cao | 385/31 |
| 6,169,604 B1 | | 1/2001 | Cao | 356/519 |
| 6,169,626 B1 | * | 1/2001 | Chen et al. | 359/279 |
| 6,459,528 B1 | * | 10/2002 | Cao | 359/341.2 |
| 6,490,386 B1 | * | 12/2002 | Cao et al. | 385/24 |
| 6,535,324 B1 | * | 3/2003 | Hwang et al. | 359/283 |
| 6,538,815 B1 | * | 3/2003 | Cao | 359/484 |
| 6,636,651 B2 | * | 10/2003 | Li | 385/11 |
| 6,636,661 B1 | * | 10/2003 | Zeng | 385/24 |
| 2002/0027472 A1 | | 3/2002 | Lee et al. | 330/4.5 |
| 2002/0028039 A1 | * | 3/2002 | Lee et al. | 385/24 |
| 2002/0076144 A1 | * | 6/2002 | Tai et al. | 385/24 |
| 2002/0181043 A1 | * | 12/2002 | Delavaux et al. | 359/124 |

* cited by examiner

Primary Examiner—Thomas G. Black
Assistant Examiner—Deandra M. Hughes

(57) ABSTRACT

An interleaving combiner (ILC) that may be used to implement hybrid amplification in a bidirectional interleaved wavelength-division multiplexing (WDM) system. The ILC implements a composite pump/signal combining and interleaving filtering function in a single topology characterized by relatively low insertion losses. In a preferred form, the ILC is a four-port device that is configured to (i) route bidirectional optical signals corresponding to different communication channels to and from unidirectional lumped optical amplifiers and (ii) combine those signals with a pump signal for distributed amplification in a fiber span between different lumped amplifiers. The ILC provides relatively high rejection for the pump signal along optical paths different from the intended one and relatively low in- and out-of-band crosstalk for the communication channels. The ILC may be implemented using a Gires-Tournois interferometer.

25 Claims, 9 Drawing Sheets

INTERLEAVING COMBINER FOR A BIDIRECTIONAL WAVELENGTH-DIVISION MULTIPLEXING SYSTEM

CROSS REFERENCE TO RELATED APPLICATIONS

The subject matter of this application is related to that of U.S. patent application Ser. No. 09/873,696, filed Jun. 4, 2001, and entitled "Bidirectional Wave Division Multiplex Systems," which application is incorporated herein by reference.

BACKGROUND OF THE INVENTION

1. Field of the Invention

The present invention relates to optical communication equipment and, more specifically, to bidirectional wavelength-division multiplexing (WDM) systems.

2. Description of the Related Art

A unidirectional WDM system uses an optical waveguide, e.g., an optical fiber, to transmit optical signals in one direction. To keep inter-channel crosstalk below a certain threshold, communication channels of such a system have to be appropriately spaced. In general, wider channel spacing corresponds to lower crosstalk, which may limit the number of available communication channels per optical fiber within an allocated wavelength range.

FIG. 1 shows an exemplary bidirectional interleaved WDM system 100 of the prior art. In system 100, optical fibers 110A–C, are configured to transmit optical signals simultaneously in two opposite directions, i.e., West-to-East (W/E) and East-to-West (E/W). System 100 has two transmitter sets 102E–W and two receiver sets 114E–W with a pair of receiver/transmitter sets located at each end (e.g., sets 102W and 114W at the West end) of system 100. Transmitter set 102W is coupled to a multiplexer (MUX) 104W configured to combine signals corresponding to individual transmitter channels of set 102W into a multi-channel signal for W/E transmission along fibers 110 to receiver set 114E by way of demultiplexer (DMUX) 112E. Transmitter set 102E is coupled to MUX 104E to similarly transmit signals in the E/W direction along fibers 110 to receiver set 114W by way of DMUX 112W. Each DMUX 112E–W is configured to separate the received multi-channel signal into different signals corresponding to individual receiver channels of the corresponding receiver set 114E–W.

System 100 of FIG. 1 has three fiber spans 110A–C, although a different number of spans may also be used. Between each pair of fiber spans 110A–C, system 100 has a bidirectional gain block 120, e.g., gain block 120A between fiber spans 110A and 110B. Each gain block 120A–B includes a separate unidirectional optical amplifier (OA) 106 for each direction configured to amplify optical signals travelling in that direction. Optical routing elements, i.e., circulators 108, are included in gain blocks 120 to direct optical signals between the corresponding OA 106 and fiber span 110. Furthermore, additional OAs 106 and circulators 108 are positioned next to multiplexers 104E–W and demultiplexers 112E–W.

FIG. 2 illustrates a representative channel allocation plan that may be used in system 100. Odd-numbered channels (e.g., channels 1, 3, 5, and 7) and even-numbered channels (e.g., channels 0, 2, 4, and 6) are interleaved and used for signal transmission in the W/E and E/W directions, respectively. The wavelengths assigned to the channels (i.e., $\lambda_1$, $\lambda_3$, $\lambda_5$, and $\lambda_7$ for the odd-numbered channels and $\lambda_0$, $\lambda_2$, $\lambda_4$, and $\lambda_6$ for the even-numbered channels) are desirably spaced, preferably equidistantly, with wavelength increasing monotonically with the channel number. Channel spacing is chosen to keep inter-channel crosstalk below a specified threshold.

One known source of inter-channel crosstalk in WDM systems (unidirectional or bidirectional) is four-wave mixing (FWM). Due to the FWM, a pair of different co-propagating (i.e., propagating in the same direction) optical signals generates (mixes into) a third co-propagating optical signal having a frequency (or wavelength) related to but different from those of the pair. If the wavelength of the third optical signal corresponds to that of a fourth co-propagating optical signal used for data transmission, the third signal will interfere with data transmission giving rise to inter-channel crosstalk for the fourth optical signal. Due to the phase-matching condition violation, counter-propagating (i.e., propagating in the opposite direction) optical signals do not mix via FWM. Using this fact, a bidirectional interleaved WDM system, such as system 100, can be configured with twice as many communication channels per optical fiber within the same wavelength range as its unidirectional counterpart without significantly increasing the amount of inter-channel crosstalk.

However, a problem that arises in a bidirectional system is that a signal propagating in a given direction will inevitably experience factors that result in some reflection of the signal that will cause part of it to travel in a direction opposite to its original direction of propagation and so to affect deleteriously the signals of channels launched to propagate in such opposite direction. Accordingly, design of bidirectional interleaved WDM systems requires special consideration of this problem, particularly in the construction of optical amplifiers.

SUMMARY OF THE INVENTION

Certain embodiments of the present invention provide an interleaving combiner (ILC) that may be used to implement hybrid amplification in a bidirectional interleaved wavelength-division multiplexing (WDM) system. The ILC implements a composite pump/signal combining and interleaving filtering function in a single topology characterized by relatively low insertion losses. In one form, the ILC is a four-port device that can be configured to (i) route bidirectional optical signals corresponding to different communication channels to and from unidirectional lumped optical amplifiers and (ii) combine those signals with a pump signal for distributed amplification in a fiber span between different lumped amplifiers. The ILC provides relatively high rejection for the pump signal along optical paths different from the intended one and relatively low in- and out-of-band crosstalk for the communication channels. The ILC may be implemented using a Gires-Tournois interferometer.

According to one embodiment, the present invention is an interleaving combiner (ILC), comprising at least four ports, wherein: the ILC is capable of routing a first set of one or more optical signals between a first port and a second port of the ILC; the ILC is capable of routing a second set of one or more optical signals between the first port and a third port of the ILC; and the ILC is capable of routing an optical pump signal between the first port and a fourth port of the ILC.

According to another embodiment, the present invention is an amplifier for use in a bidirectional wavelength-division multiplexing system, the amplifier comprising: (a) a first and a second ILC, each ILC comprising at least four ports, wherein: each ILC is capable of routing a first set of one or more optical signals between a first port and a second port of the ILC; each ILC is capable of routing a second set of one or more optical signals between the first port and a third port of the ILC; and each ILC is capable of routing an optical pump signal between the first port and a fourth port of the ILC; (b) a first optical amplifier (OA) configured between the second ports of the first and second ILCs; (c) a second OA configured between the third ports of the first and second ILCs, wherein each of the first and second ILCs is configured to receive the optical pump signal.

According to yet another embodiment, the present invention is an ILC, comprising: (A) first, second, and third ports, wherein the ILC is designed to: route a first set of one or more optical signals between the first port and the second port of the ILC; route a second set of one or more optical signals between the first port and the third port of the ILC; attenuate optical signals corresponding to the second set between the first and second ports; and attenuate optical signals corresponding to the first set between the first and third ports; and (B) a fourth port, wherein the ILC is designed to: route an optical pump signal between the first port and the fourth port of the ILC; and attenuate the optical pump signal for any optical path different from an optical path corresponding to the first and fourth ports.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Interleaving Filter

Figure 1:
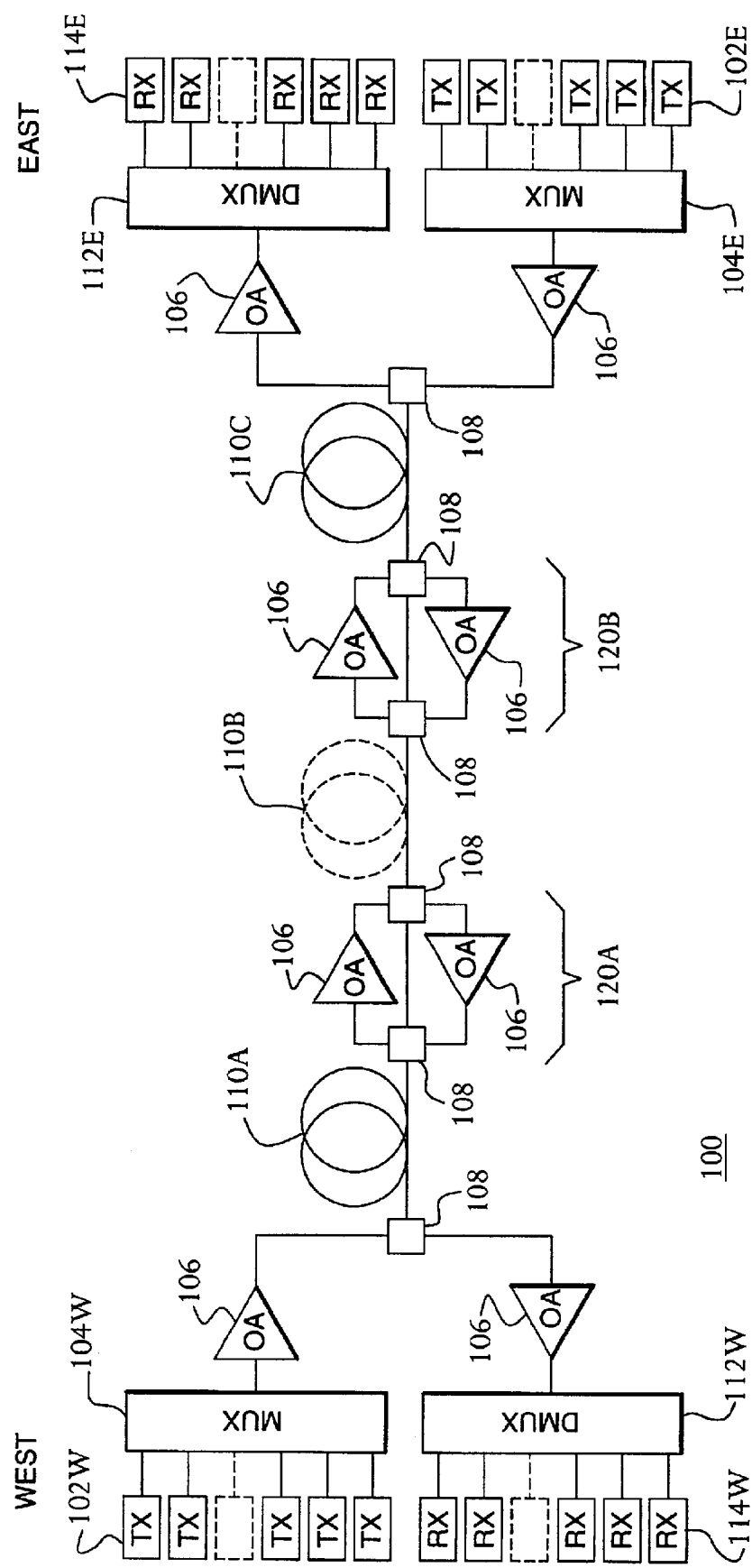
FIG. 1 shows an exemplary bidirectional interleaved WDM system of the prior art.
Figure 2:
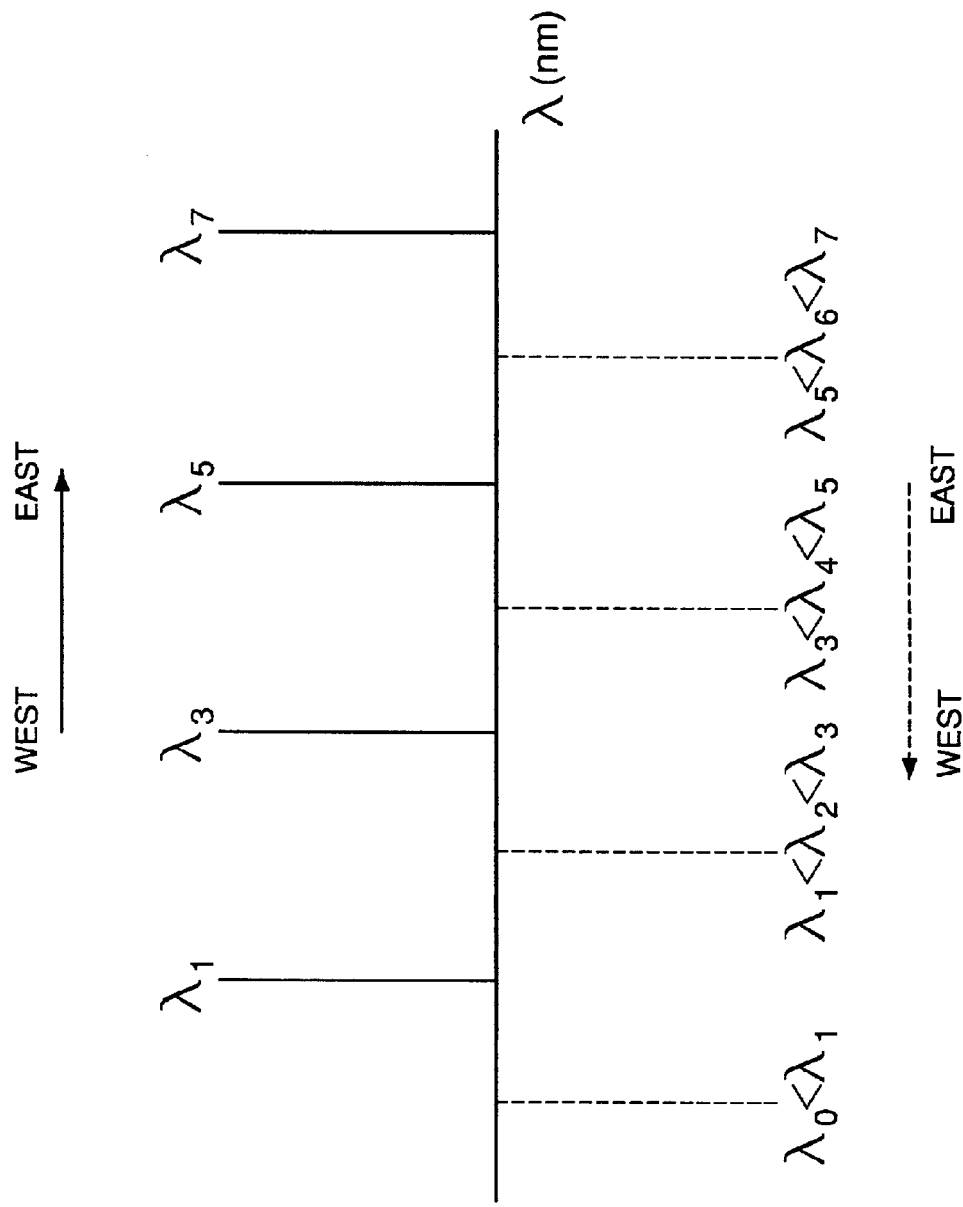
FIG. 2 illustrates representative channel allocation that may be used in the system of FIG. 1.
Figure 3B:
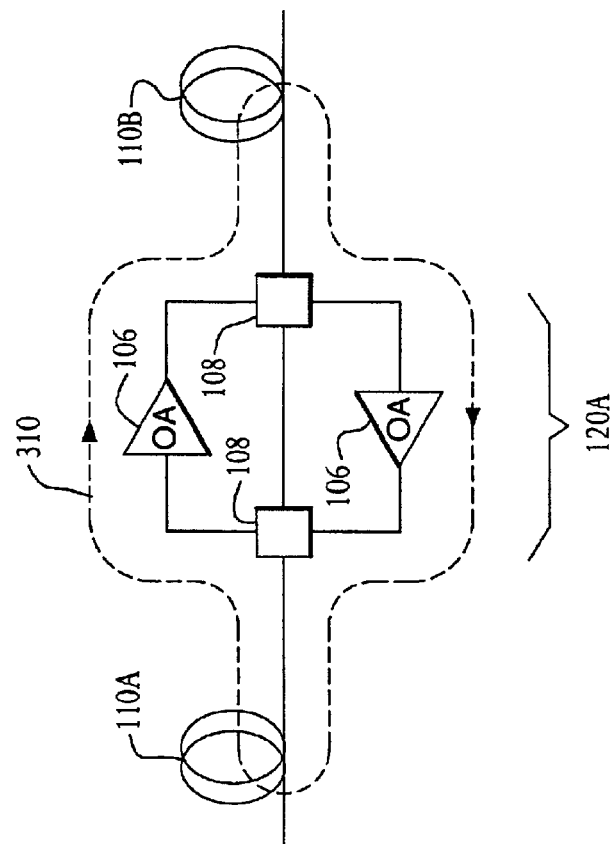
FIGS. 3A–B illustrate representative transmission and amplification impairments in the system of FIG. 1.
Figure 3A:
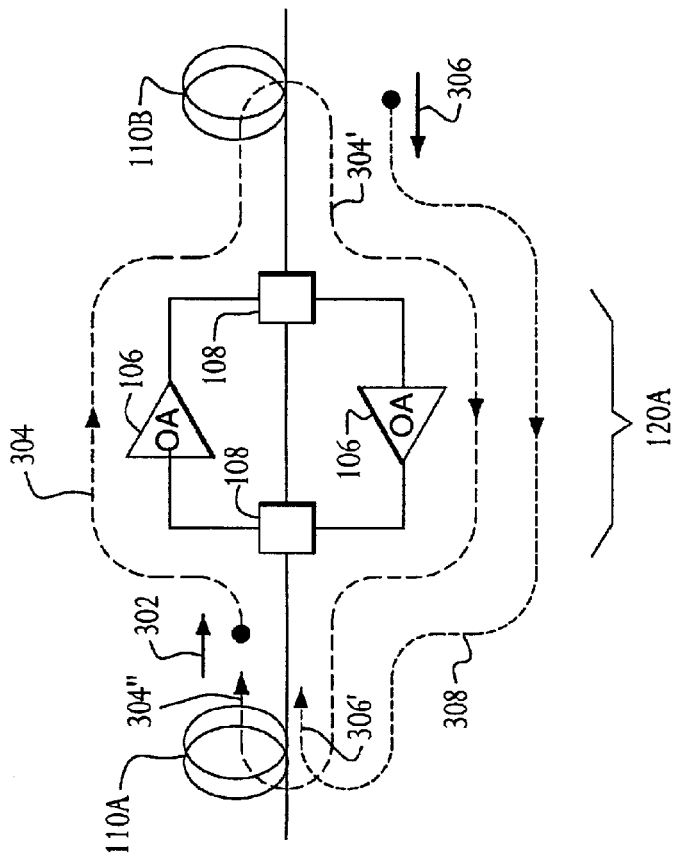

FIG. 3A illustrates possible mechanisms of in- and out-of-band crosstalk in bidirectional interleaved WDM system 100 of FIG. 1. An optical fiber coupled to an optical amplifier (e.g., fiber span 110A or 110B coupled to gain block 120A) may act as a distributed Rayleigh mirror, e.g., due to small variations in the index of refraction along the fiber length. Consequently, a small fraction of an optical signal propagating in one direction in the fiber is reflected in the opposite direction.

Dashed line 304 in FIG. 3A illustrates a representative optical path that may contribute to in-band crosstalk. More specifically, a fraction of a W/E signal 302 is reflected by a Rayleigh mirror in fiber span 110B to generate signal 304'. Signal 304' is reflected by a second Rayleigh mirror in fiber span 110A to generate signal 304". Signal 304" is a noise signal at the same wavelength as signal 302 (accordingly termed in-band crosstalk).

FIG. 3B illustrates the phenomenon of self-oscillation that may also be caused by the reflections illustrated by line 304 in FIG. 3A. The difference in the behavior in the case of in-band crosstalk (FIG. 3A) and self-oscillation (FIG. 3B) is determined by a relative gain of optical amplifiers 106. More specifically, if the gain level is above a certain threshold, optical losses along a closed-loop optical path shown by dashed line 310 in FIG. 3B are appropriately compensated, thus causing self-oscillation. This phenomenon may possibly render entire gain block 120A inoperable.

Referring again to FIG. 3A, dotted line 308 illustrates a representative optical path that may contribute to out-of-band crosstalk. In that case, a small fraction of an E/W signal 306 is reflected by a Rayleigh mirror in fiber span 110A, e.g., to generate signal 306' that is co-propagating with signal 302. Since different channels in system 100 have different wavelengths, signal 306' will be an out-of-band noise source for signal 302.

Commonly assigned U.S. patent application Ser. No. 09/873,696, by Delavaux and Radic (hereafter the '696 application), entitled "Bidirectional Wave Division Multiplex Systems," and incorporated herein by reference, deals with the problems illustrated by FIGS. 3A–B. In particular, the '696 application discloses an interleaving filter (also termed an interleaver) that may be used in system 100, e.g., to reduce the amount of crosstalk.

Figures 4, 5:
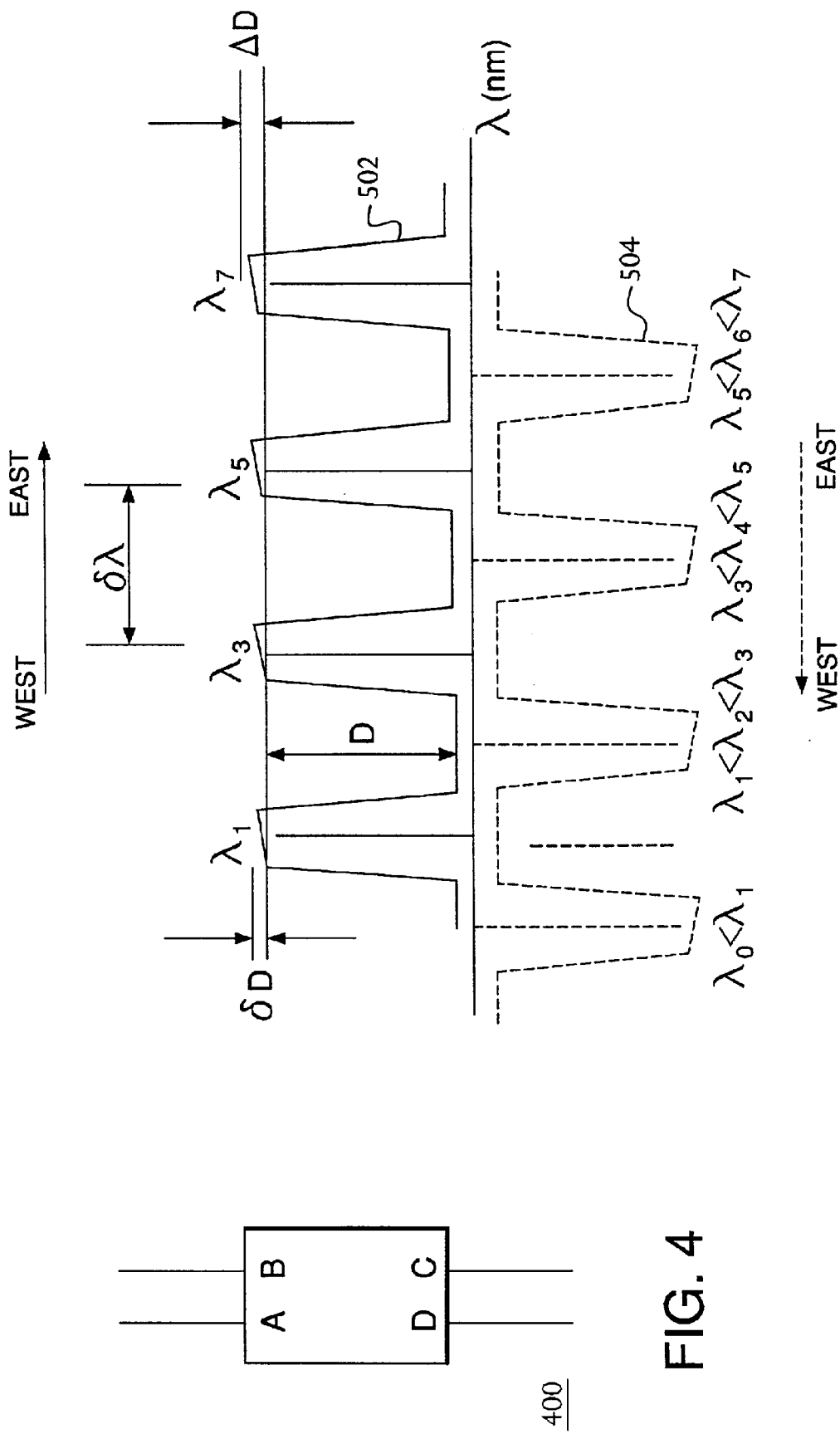
FIG. 4 shows an interleaver that may be used in the system of FIG. 1.
FIG. 5 illustrates the spectral response of the interleaver shown in FIG. 4.

FIG. 4 shows in symbolic form a four-port interleaver 400 according to one embodiment of the invention disclosed in the '696 application. Interleaver 400 is configured to operate as follows. Signals corresponding to odd-numbered channels entering at port A exit at port D, while signals corresponding to even-numbered channels entering at port A exit at port C. The operation is reciprocal, i.e., signals corresponding to odd- and even-numbered channels entering at ports D and C, respectively, exit at port A. Similar functionality, direct and reciprocal, exists for port B. That is, signals corresponding to odd- and even-numbered channels entering at port B exit at ports C and D, respectively. Signals corresponding to odd-numbered channels entering at port C exit at port B and signals corresponding to even-numbered channels entering at port D exit at port B.

FIG. 5 illustrates the spectral response of interleaver 400. Solid line 502 represents the transmissivity of interleaver 400 between ports A and D and between ports B and C. As seen, it is high around wavelengths corresponding to the odd-numbered channels and low around wavelengths corresponding to the even-numbered channels. Dashed line 504 similarly represents the transmissivity of interleaver 400 between ports A and C and between ports B and D. As seen, it is high around wavelengths corresponding to the even-numbered channels and low around wavelengths corresponding to the odd-numbered channels. As can be appreciated from FIG. 5, interleaver 400 supports two sets of channels with interleaved transmissivity characteristics.

Figure 6:
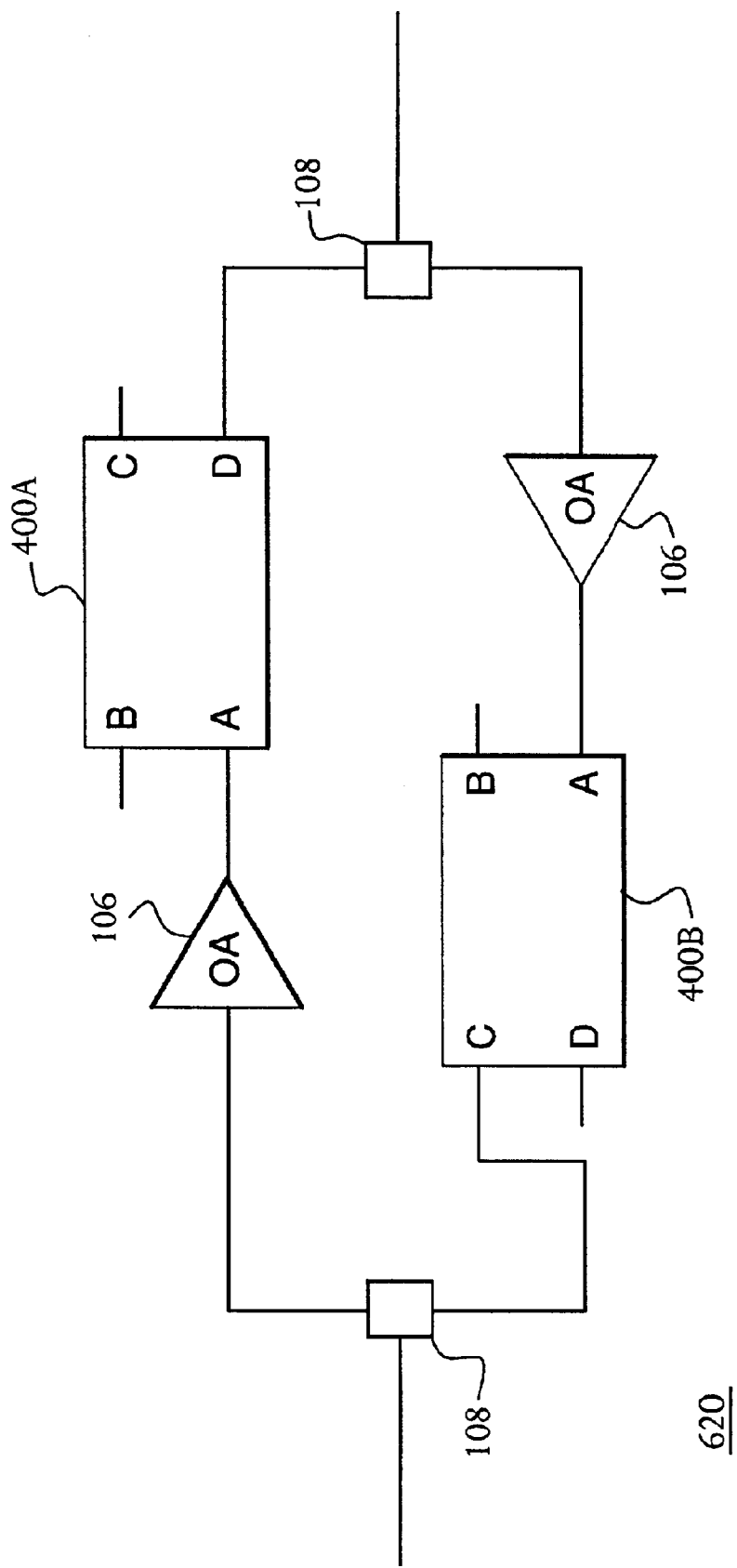
FIG. 6 shows how the interleaver of FIG. 4 may be used in the system of FIG. 1 to reduce crosstalk.

FIG. 6 shows how interleaver 400 may be used in system 100 of FIG. 1 to reduce crosstalk according to one embodiment of the invention disclosed in the '696 application. In particular, each gain block 120 of FIG. 1 is replaced by a modified gain block 620 shown in FIG. 6 having two interleavers 400A–B, each interleaver configured to a corresponding OA 106. For example, the path corresponding to the even-numbered (or E/W) channels has interleaver 400B configured to route optical signals from port A to port C. Due to the transmissivity characteristics shown in FIG. 5, interleaver 400B reduces the amount of out-of-band crosstalk (illustrated in FIG. 3A) for the W/E channels. In addition, the path corresponding to the odd-numbered (or W/E) channels has interleaver 400A configured to route optical signals from port A to port D. Combined transmissivity characteristics of interleavers 400A–B reduce the amount of in-band crosstalk illustrated in FIG. 3A and limit the self-oscillation illustrated in FIG. 3B.

Additional implementations of gain blocks for use in system 100 configured with one or more interleavers 400 are disclosed in the '696 application.

Interleaving Combiner

One known method of increasing unrepeated fiber span reach (i.e., the length of fiber between gain blocks) is to use distributed signal amplification in addition to lumped (i.e., localized) signal amplification (e.g., implemented by gain blocks 120 or 620). One type of distributed signal amplifier is an optical fiber coupled to a Raman pump using a pump/signal combiner. The principle of Raman amplification is based on Raman scattering in the optical fiber. For example, a pump beam at 1480 nm generates a gain band peaking at about 1580 nm, which band is about 20- to 30-nm wide. An optical signal at a wavelength within the Raman band is amplified via the process of stimulated light emission, which couples energy from the Raman band into that optical signal. A typical Raman pump may increase the unrepeated fiber span reach, for example, from 80 km to 120 km. However, preferred embodiments of a bidirectional interleaved WDM system employing Raman amplification may need to be configured with interleaving filters.

Figure 7:
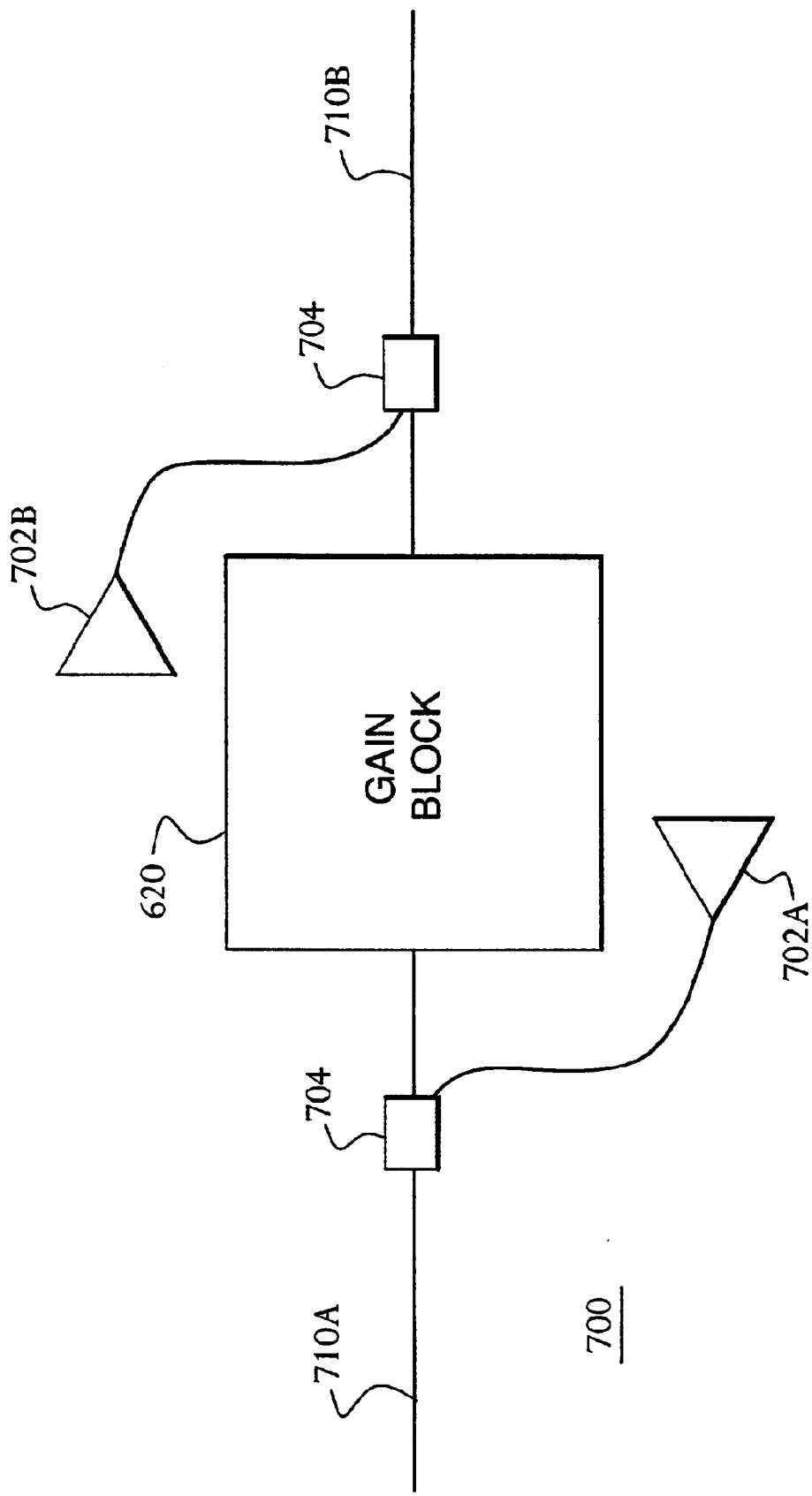
FIG. 7 shows a hybrid amplifier that may be used in the system of FIG. 1.

FIG. 7 shows one implementation of a hybrid amplifier 700 that may be used in system 100. Amplifier 700 is configured to use both distributed Raman amplification and lumped amplification. Amplifier 700 comprises gain block 620 of FIG. 6, two Raman pumps 702A–B, and two pump/signal combiners 704. Gain block 620 provides lumped signal amplification and crosstalk reduction as described above, e.g., in the context of FIG. 6. Raman pumps 702A and 702B are configured to pump fiber spans 710A and 710B at the West and East sides of amplifier 700, respectively. Each pump/signal combiner 704 is configured to provide coupling between gain block 620, Raman pump 702, and fiber span 710 (e.g., Raman pump 702B and fiber span 710B at the East side of amplifier 700). Pump/signal combiner 704 is a three-port device that may be, for example, model DW603-48/55 available from Fitel Technologies, Inc., of Clinton, N.J.

One disadvantage of amplifier 700 is that it has a lossy element, i.e., pump/signal combiner 704, in front of the lumped amplifier segment, i.e., gain block 620, thus degrading performance of that segment. In addition, gain block 620 has a lossy element of its own, i.e., interleaver 400, that further degrades the composite performance of amplifier 700. It is, therefore, of great interest to implement the pump/signal combining and interleaving filtering functions in a single optical element characterized by a smaller optical loss than a combination of pump/signal combiner 704 and interleaver 400, e.g., as used in amplifier 700.

Figure 8:
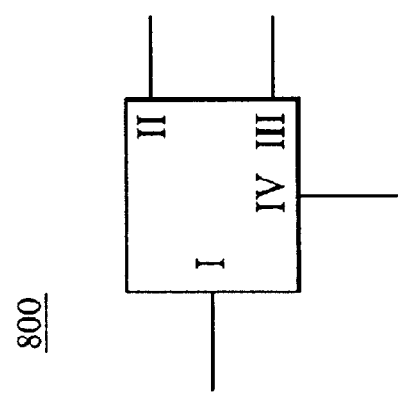
FIG. 8 shows in symbolic form an interleaving combiner according to one embodiment of the present invention.

FIG. 8 shows in symbolic form a four-port interleaving combiner (ILC) 800 according to one embodiment of the present invention. ILC 800 is configured to operate as follows. Optical signals corresponding to the odd-numbered (W/E) optical channels of system 100 are transmitted via a I–II optical path and may travel either from port I to port II or from port II to port I. Similarly, optical signals corresponding to the even-numbered (E/W) optical channels of system 100 are transmitted via a I–III optical path and may travel either from port I to port III or from port III to port I. A Raman pump beam enters at port IV and may travel in one direction to port I where it is combined with the optical signals corresponding to whatever optical channels exiting at port I.

Figure 9:
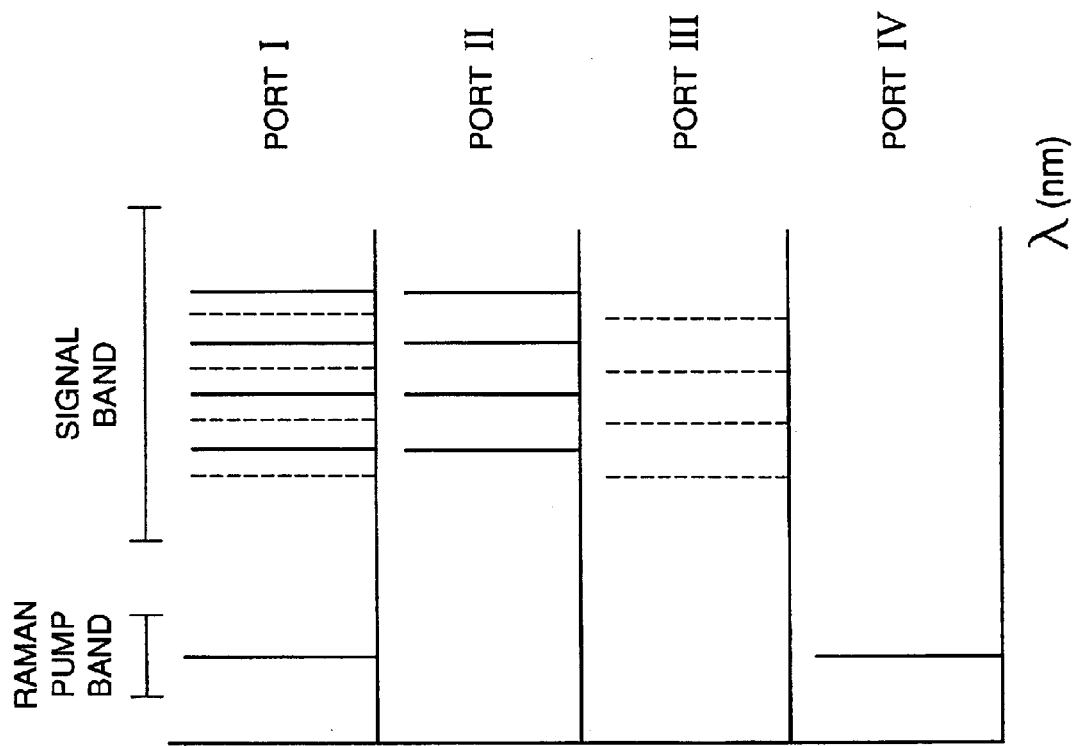
FIG. 9 illustrates the functionality of the interleaving combiner shown in FIG. 8 according to one embodiment of the present invention.

FIG. 9 further illustrates the functionality of ILC 800 by showing representative spectra of signals in the fibers coupled to the corresponding ILC ports. In particular, at port I, a Raman pump signal and signals corresponding to all (odd and even) optical channels are present. At ports II and III, essentially only the optical signals corresponding to the odd- or even-numbered optical channels, respectively, are present. At port IV, essentially only the Raman pump signal is present. In one embodiment, ILC 800 is designed to provide a high degree of isolation between ports. For example, ILC 800 may be configured to have a degree of rejection greater than about 25 dB for wavelengths corresponding to (i) the even-numbered optical channels along the I–II optical path and (ii) the odd-numbered optical channels along the I–III optical path. In addition, ILC 800 may be designed to provide a degree of rejection greater than about 20 dB for the Raman pump signal along any optical path except for the VI–I optical path. Different embodiments may provide different degrees of isolation between ports.

Figure 10:
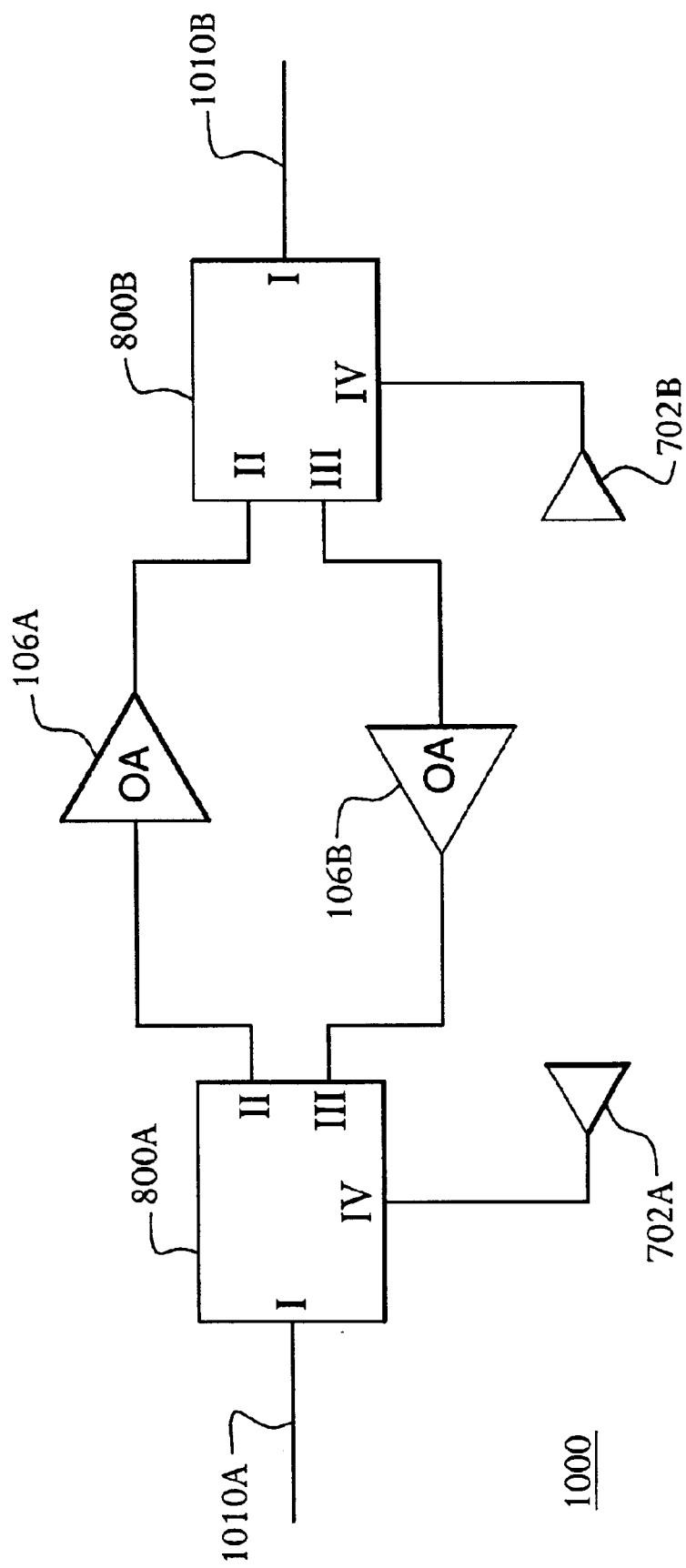
FIG. 10 shows a hybrid amplifier employing the interleaving combiner illustrated by FIGS. 8 and 9 according to one embodiment of the present invention.

FIG. 10 shows a hybrid amplifier 1000 that may be used in system 100 in place of each gain block 120, according to one embodiment of the present invention. Amplifier 1000 comprises two ILCs 800A–B, two OAs 106A–B, and two Raman pumps 702A–B. Amplifier 1000 is configured to two fiber spans 1010A–B and operates as follows. A W/E optical signal (corresponding to an odd-numbered optical channel of system 100) reaches amplifier 1000 through fiber span 1010A, enters ILC 800A at port I, and is routed to port II. The signal is then amplified by OA 106A and applied to port II of ILC 800B, which routes the signal to port I, where it is optionally combined with a pump signal generated by Raman pump 702B for distributed amplification in fiber span 1010B. Similarly, an E/W optical signal (corresponding to an even-numbered optical channel of system 100) is routed from fiber span 1010B to fiber span 1010A via ports I and III of ILC 800B, OA 106B, and ports III and I of ILC 800A. The E/W optical signal is similarly amplified by OA 106B and is combined with a pump signal generated by Raman pump 702A for distributed amplification in fiber span 1010A.

Figure 11:
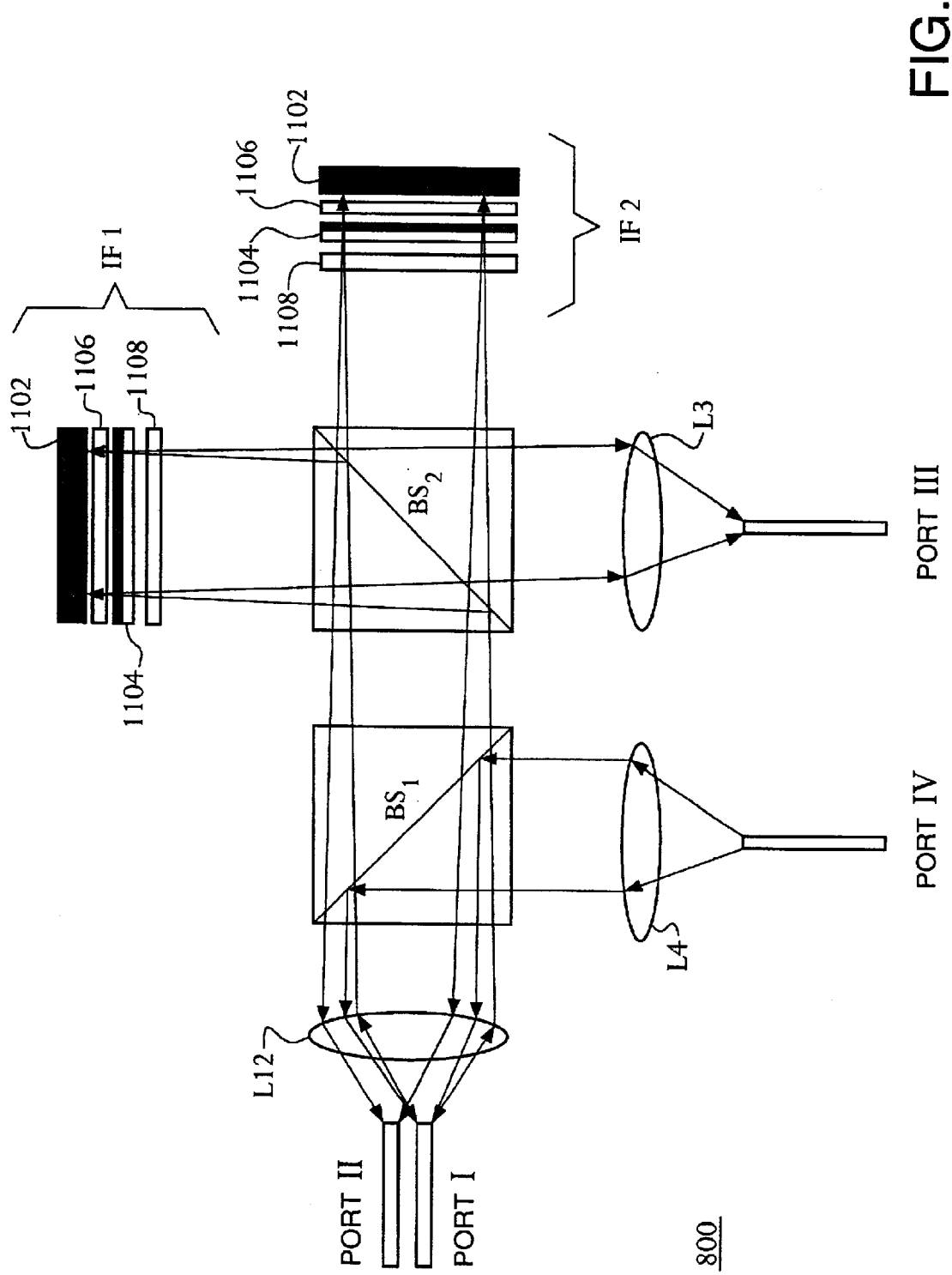
FIG. 11 shows a schematic diagram of the interleaving combiner of FIG. 8 according to one embodiment of the present invention.

FIG. 11 shows a schematic diagram of ILC 800 that may be used in amplifier 1000 of FIG. 10, according to one embodiment of the present invention. ILC 800 comprises three lenses L12, L3, and L4, two beam-splitting elements BS1 and BS2, and two interferometers IF1 and IF2. ILC 800 is configured with four fiber optic cables corresponding to its four ports (i.e., ports I–IV) having the functionality described above in the context of FIGS. 8 and 9. Each fiber optic cable acts essentially as a point source or collector of light, depending on the direction of light propagation. Lenses L12, L3, and L4 are configured to collimate a beam of light emerging from the corresponding fiber optic cable and/or to couple a collimated beam of light into the corresponding fiber optic cable. Lens L12 is configured to serve two ports (i.e., ports I and II), while lenses L3 and L4 are configured to serve one port each (i.e., port III and port IV, respectively).

Element BS1 is configured to combine a Raman pump signal entering ILC 800 at port IV with optical signals corresponding to odd-numbered optical channels entering at port II for exit at port I and even-numbered optical channels entering at port III for exit at port I. In one embodiment, element BS1 is a polarization-insensitive beam splitter essentially transparent (e.g., introducing a loss of less than 0.5 dB) for the optical signals in the signal band, thus allowing such signals to freely travel between ports I and II or ports I and III. At the same time, element BS1 is configured to deflect most (e.g., 99.9%) of a signal spectrally located in the Raman pump band from port IV to port I, thus implementing the pump/signal combining function.

Element BS2 is a polarization-sensitive beam splitter configured to direct optical signals based on polarization. For example, BS2 splits a polarization-scrambled optical signal, e.g., entering ILC 800 at port I into two differently polarized copies. Each copy travels via a separate optical path defined by element BS2 and the corresponding interferometer (i.e., IF1 or IF2). Each interferometer may be a Gires-Tournois (GT) interferometer configured to introduce a phase shift of 180 degrees into each optical signal corresponding to an even-numbered channel while maintaining the phase of each optical signal corresponding to an odd-numbered channel. After travelling their respective paths, the copies recombine at element BS2, wherein the phase shift acquired by the copies determines the polarization of the resulting recombinant signal and, consequently, the port towards which the recombinant signal is directed by element BS2. For example, the polarization of a W/E optical signal after recombination is such that it is directed toward port II, whereas the polarization of an E/W optical signal is such that it is directed toward port III, thus implementing the interleaving filtering function.

In one embodiment, interferometers IF1–2 may be similar to those disclosed in (i) U.S. Pat. No. 6,130,971, issued on Oct. 10, 2000, and entitled "Fiber Optic Dense Wavelength Division Multiplexer with a Phase Differential Method of Wavelength Separation Utilizing a Polarization Beam Splitter and a Nonlinear Interferometer," and (ii) U.S. Pat. No. 6,169,604 B1, issued on Jan. 2, 2001, and entitled "Nonlinear Interferometer for Fiber Optic Dense Wavelength Division Multiplexer Utilizing a Phase Bias Element to Separate Wavelengths in an Optical Signal," the teachings of both of which are incorporated herein by reference.

For example, in one embodiment, each interferometer IF1–2 comprises two glass plates 1102 and 1104. The inside face of glass plate 1102 is coated with a layer of reflective coating having a reflectivity preferably of 100%. The side of glass plate 1104 facing glass plate 1102 is coated with a layer of reflective coating having a reflectivity preferably of approximately 18%. Each interferometer further comprises (i) a $\lambda/4$ plate 1106 placed in the cavity defined by glass plates 1102 and 1104; and (ii) a $\lambda/8$ plate 1108 located outside said cavity. $\lambda/4$ plate 1106 is configured to introduce a phase shift of 180 degrees into optical signals corresponding to the even-numbered channels while maintaining the phase of optical signals corresponding to the odd-numbered channels. $\lambda/8$ plate 1108 is configured to achieve a desired shape and degree of separation between the pass bands of interferometers IF1–2. Further details on various possible implementations of interferometers IF1–2 as GT interferometers may be found, e.g., in the above referenced U.S. Pat. No. 6,169,604 B1.

Embodiments of the present invention may provide one or more of the following advantages: (i) relatively low cumulative losses for the composite pump/signal combining and interleaving filtering function; (ii) relatively high rejection for the Raman pump signal along optical paths different from the intended one; (iii) relatively low in- and out-of-band crosstalk; and (iv) increased unrepeated fiber span reach. In addition, the invention may be easily adapted for use in existing bidirectional interleaved WDM systems. Although the invention was described for Raman pump amplification, those skilled in the art will appreciate that it may also be used with other types of distributed amplification, e.g., using erbium-doped fiber amplifiers (EDFA). Furthermore, a single Raman pump may be configured to pump two fiber spans, e.g., using a splitter.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. An interleaving combiner (ILC), comprising at least four ports, wherein:
   the ILC is capable of routing a first set of one or more optical signals between a first port and a second port of the ILC;
   the ILC is capable of routing a second set of one or more optical signals between the first port and a third port of the ILC; and
   the ILC is capable of routing an optical pump signal between the first port and a fourth port of the ILC.

2. The ILC of claim 1, wherein:
   the ILC is capable of attenuating optical signals corresponding to the second set between the first and second ports;
   the ILC is capable of attenuating optical signals corresponding to the first set between the first and third ports; and
   the ILC is capable of attenuating the optical pump signal for any optical path different from an optical path corresponding to the first and fourth ports.

3. The ILC of claim 1, wherein the ILC is configured to have a degree of rejection greater than about 25 dB for:
   (i) the optical signals corresponding to the first set along an optical path between the first and third ports; and
   (ii) the optical signals corresponding to the second set along an optical path between the first and second ports.

4. The ILC of claim 3, wherein the ILC is configured to have a degree of rejection greater than about 20 dB for the optical pump signal along optical paths different from an optical path between the fourth port and the first port.

5. The ILC of claim 1, wherein the optical pump signal is a Raman pump signal.

6. The ILC of claim 1, further comprising:
a first beam splitter optically coupled to the first and fourth ports;
a second beam splitter optically coupled to the first, second, and third ports; and
two interferometers optically coupled to the second beam splitter, wherein:
the first beam splitter is substantially transparent for the optical signals corresponding to the two sets and substantially reflective for the optical pump signal;
the second beam splitter is a polarization-sensitive beam splitter configured to (I) split each optical signal into two copies; (II) direct each copy to a different interferometer; (III) recombine the two copies after their return from their respective interferometers into a recombinant signal; and (IV) direct the recombinant signal to the corresponding port based on the polarization of the recombinant signal; and
each interferometer is configured to introduce a phase shift of about 180 degrees into signal copies corresponding to the first set while substantially maintaining a phase of signal copies corresponding to the second set.

7. The ILC of claim 6, wherein each port has a fiber optic cable coupled to a bidirectional wavelength-division multiplexing (WDM) system and a lens configured to optically couple the fiber optic cable to the corresponding beam splitter.

8. The ILC of claim 7, wherein the first and second ports are configured with a single lens.

9. The ILC of claim 6, wherein each interferometer of the two interferometers is a Gires-Tournois (GT) type interferometer.

10. The ILC of claim 1, wherein:
the ILC is capable of routing bidirectional optical signals between the first port and the second port of the ILC; and
the ILC is capable of routing bidirectional optical signals between the first port and the third port of the ILC.

11. An amplifier for use in a bidirectional wavelength-division multiplexing (WDM) system, the amplifier comprising:
(a) a first and a second interleaving combiner (ILC), each ILC comprising at least four ports, wherein:
each ILC is capable of routing a first set of one or more optical signals between a first port and a second port of the ILC;
each ILC is capable of routing a second set of one or more optical signals between the first port and a third port of the ILC; and
each ILC is capable of routing an optical pump signal between the first port and a fourth port of the ILC;
(b) a first optical amplifier (OA) configured between the second ports of the first and second ILCs;
(c) a second OA configured between the third ports of the first and second ILCs, wherein each of the first and second ILCs is configured to receive the optical pump signal.

12. The invention of claim 11, further comprising:
(d) a first Raman pump configured to provide a first optical pump signal to the first ILC; and
(e) a second Raman pump configured to provide a second optical pump signal to the second ILC.

13. The invention of claim 11, wherein:
the first set is interleaved with the second set;
optical signals corresponding to the same set are substantially co-propagating in the system; and
optical signals corresponding to different sets are substantially counter-propagating in the system.

14. The invention of claim 11, wherein the first port of each ILC is coupled to the system using a fiber span.

15. The invention of claim 14, wherein each OA is a lumped unidirectional OA and each fiber span is configured for distributed amplification of optical signals using the optical pump signal.

16. The invention of claim 11, wherein at least one ILC comprises:
a first beam splitter optically coupled to the first and fourth ports;
a second beam splitter optically coupled to the first, second, and third ports; and
two interferometers optically coupled to the second beam splitter, wherein: the first beam splitter is substantially transparent for the optical signals corresponding to the two sets and substantially reflective for the optical pump signal;
the second beam splitter is a polarization-sensitive beam splitter configured to (I) split each optical signal into two copies; (II) direct each copy to a different interferometer; (III) recombine the two copies after their return from their respective interferometers into a recombinant signal; and (IV) direct the recombinant signal to the corresponding port based on the polarization of the recombinant signal; and
each interferometer is configured to introduce a phase shift of about 180 degrees into signal copies corresponding to the first set while substantially maintaining a phase of signal copies corresponding to the second set.

17. The invention of claim 16, wherein for at least one ILC each port has a fiber optic cable coupled to the system and a lens configured to optically couple the fiber optic cable to the corresponding beam splitter.

18. The invention of claim 17, wherein for at least one ILC the first and second ports are configured with a single lens.

19. The invention of claim 16, wherein each interferometer of the two interferometers is a Gires-Tournois (GT) type interferometer.

20. The invention of claim 11, wherein:
each ILC is capable of attenuating optical signals corresponding to the second set between the first and second ports;
each ILC is capable of attenuating optical signals corresponding to the first set between the first and third ports; and
each ILC is capable of attenuating the optical pump signal for any optical path different from an optical path corresponding to the first and fourth ports.

21. An interleaving combiner (ILC), comprising:
(A) first, second, and third ports, wherein the ILC is designed to:
route a first set of one or more optical signals between the first port and the second port of the ILC;
route a second set of one or more optical signals between the first port and the third port of the ILC;
attenuate optical signals corresponding to the second set between the first and second ports; and attenuate optical signals corresponding to the first set between the first and third ports; and (B) a fourth port, wherein the ILC is designed to:
route an optical pump signal between the first port and the fourth port of the ILC; and
attenuate the optical pump signal for any optical path different from an optical path corresponding to the first and fourth ports.

22. The ILC of claim 21, further comprising:
a first beam splitter optically coupled to the first and fourth ports;
a second beam splitter optically coupled to the first, second, and third ports; and
two interferometers optically coupled to the second beam splitter, wherein:
the first beam splitter is substantially transparent for the optical signals corresponding to the two sets and substantially reflective for the optical pump signal;
the second beam splitter is a polarization-sensitive beam splitter configured to (I) split each optical signal into two copies; (II) direct each copy to a different interferometer; (III) recombine the two copies after their return from their respective interferometers into a recombinant signal; and (IV) direct the recombinant signal to the corresponding port based on the polarization of the recombinant signal; and each interferometer is configured to introduce a phase shift of about 180 degrees into signal copies corresponding to the first set while substantially maintaining a phase of signal copies corresponding to the second set.

23. The ILC of claim 22, wherein each port has a fiber optic cable coupled to a bidirectional wavelength-division multiplexing (WDM) system and a lens configured to optically couple the fiber optic cable to the corresponding beam splitter.

24. The ILC of claim 23, wherein the first and second ports are configured with a single lens.

25. The ILC of claim 22, wherein each interferometer of the two interferometers is a Gires-Tournois (GT) type interferometer.

* * * * *